US006545068B1

(12) United States Patent
Simmons et al.

(10) Patent No.: US 6,545,068 B1
(45) Date of Patent: Apr. 8, 2003

(54) GROUTING COMPOSITIONS

(75) Inventors: Walter John Simmons, Martinsburg, WV (US); Domenic Joseph Barsotti, Vineland, NJ (US); Phillip Edwin Gramlich, Hurricane, WV (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/500,561

(22) Filed: Feb. 9, 2000

(51) Int. Cl.[7] .................. C08L 5/00; C08L 67/06; C09J 105/00; C09J 167/06
(52) U.S. Cl. .............. 524/56; 523/504; 523/505; 523/509; 523/511; 523/514; 523/515; 523/516; 523/521; 523/527; 524/4; 524/5; 524/57; 524/58; 524/906; 156/327; 156/332; 156/336
(58) Field of Search ................ 523/504, 505, 523/509, 511, 514, 515, 516, 521, 527; 524/4, 5, 56, 57, 58, 906; 156/327, 332, 336

(56) References Cited

U.S. PATENT DOCUMENTS

| 4,280,943 A | * | 7/1981 | Bivens et al. | ............... 523/505 |
| 4,350,783 A | * | 9/1982 | Talbot | ......................... 523/505 |
| 4,722,976 A | * | 2/1988 | Ceska | ......................... 524/906 |

FOREIGN PATENT DOCUMENTS

| DE | 3226602 | * | 1/1984 | ................. 524/906 |
| JP | 3399 | * | 1/1985 | ................. 524/906 |
| JP | G1-190666 | | 7/1989 | ......... C07C/179/14 |

* cited by examiner

Primary Examiner—Peter Szekely

(57) ABSTRACT

A composition is provided which comprises a first component, a second component, and a compressible substance in which the first component comprises a peroxide, a liquid which comprises water, and a solid particulate; and the second component comprises a polymer, a crosslinking agent, and a solid particulate. The composition can further comprises a sugar. Also disclosed is a process that can be used for preventing a grouting composition from becoming limp. The process comprises combining a grouting composition with a compressible substance in which the composition comprises a first component and a second component as disclosed above.

26 Claims, No Drawings

GROUTING COMPOSITIONS

FIELD OF THE INVENTION

The present invention relates to a grouting composition.

BACKGROUND OF THE INVENTION

Anchor bolts are employed in various fields of engineering, for example, as strengthening or reinforcing members in rock formations and in structural bodies. The bolts are inserted into drill holes in the formation or body, and often are fixed or anchored, at their inner end or over substantially their entire length, by means of a reactive grouting composition that hardens around the bolt. When used in a mine roof, bolts grouted in this manner help significantly to prevent mine roof failure.

A grouting composition generally contains a resin and water. Such a water-based composition is typically placed in boltholes using tubular compartmented cartridges and should be held rigid by the internal package pressure. The internal pressure is created by a cartridging machine when end clips are applied to the cartridge film to seal the contents.

However, within about two months, the cartridges become limp or lacking in stiffness or firmness. Such limp cartridges are a problem for the customer because limp cartridges are difficult to insert into overhead boreholes. It was found that most of the limpness was caused by water permeating through the film and not from leakage through the end clips. For example, a Mylar® (terephthalate polyester) film used throughout the industry because of its high modulus has an extremely high permeability to water. Thus, any grouting formulation containing water is subject to limpness due to loss of water volume. Formulations that do not use water are not subject to this problem. However for formulations described in the U.S. Pat. No. 4,280,943, the limpness can be a significant problem.

Solutions that reduce the water loss such as coating the polyester film with Sarane®, metal, or polyethylene work well and have been employed to reduce the water loss. However, such solutions are very expensive typically doubling the packaging cost.

Therefore, there is an increasing need to develop a composition that can retains the firmness or stiffness of the package for a reasonable period time and at reasonable cost. One advantage of the present invention is that, instead of reducing the water loss to retain stiffness, the invention composition keeps the cartridge package stiff as water is lost. Other advantages of the invention will become more apparent as the invention is more fully disclosed hereinbelow.

SUMMARY OF THE INVENTION

According to the invention, a composition that can be used as a grouting composition is provided. The composition comprises, consists essentially of, or consists of a compressible substance, a first component, and a second component. The first component comprises a peroxide, a liquid that comprises water, a solid particulate, and optionally a sugar. The second component comprises a polymer, a crosslinking agent, and a solid particulate. The compressible substance can be present in the first component, the second component, or both.

According to another embodiment of the invention, a process for substantially improving the firmness of a grouting composition is provided. The process comprises introducing a compressible substance into a grouting composition. The grouting composition can comprise the first and second components disclosed above. The compressible substance can be introduced into the first component, the second component, or both.

DETAILED DESCRIPTION OF THE INVENTION

The term "first composition" or "second composition" is interchangeably used in the application as "first component", or "second component". The term "compressible substance" refers to a material that, when present in a grouting composition, expands as the water or water vapor in the grouting composition is lost thereby maintaining a rigid package of the composition. The term "substantially" refers to more than trivial. The term "limp" or "limpness" refers to the state that a cartridge containing a grouting composition is not as rigid as the cartridge originally packaged. The two components can be separated by, for example, a floating polyester membrane.

According to the invention the compressible substance can be any compressible substance that expands as the water or water vapor is lost thereby maintaining a rigid package of the grouting composition such that it can be easily inserted in boreholes. Examples of preferred compressible substances include, but are not limited to, nitrogen, oxygen, air, a nonflammable gas, soft rubber, foam rubber, and combinations of two or more thereof. Examples of nonflammable gases include, but are not limited to, Freon® 12, carbon dioxide, argon, or combinations thereof. The compressible substance used in the invention composition is substantially not permeable through the cartridge of the composition or is substantially less permeable than water. Compressible solids such as rubber can also be employed.

The compressible substance must be substantially less permeable than water and low in cost. Nitrogen is an ideal compressible substance because it is over 1000 times less permeable than water through polyester film and is low in cost.

The compressible substance can be present in the first component, second component, or both. Generally, it can be present in about 0.1 to about 40, preferably about 1 to about 20, and most preferably 2 to 10 volume % of the total volume of the composition. The volume of the compressible substance generally is such that it is at least equal to the volume of water that is lost for the desired use period. For example, if 10 cc (cubic centimeter) of water is lost from the package over a 6-month period, the volume of compressible substance is 10 cc. However, generally, it requires at least about 10 cc.

The compressible substance can be combined with the first composition, the second composition, or a composition comprising the first and second composition. The compressible substance can be introduced into the composition by any method known to one skilled in the art such as, for example, whipping in very small bubbles that do not rapidly separate. Preferably the compressible substance such as a gas can be injected at a packaging machine though a small tube or tubes that creates a series of small bubbles over the length of the package in either first compartment, second compartment, or both.

Suitable peroxide can be an organic peroxide, an inorganic peroxide, or combinations thereof. The presently preferred peroxide is an organic peroxide, which can be any diacyl peroxides. Examples of suitable organic peroxides include, but are not limited to, benzoyl peroxide, dichlorobenzoyl peroxide, dibromobenzoyl peroxide, dimethoxy benzoyl peroxide, and combinations of two or more thereof. The presently preferred organic peroxide is benzoyl peroxide because it is readily available and effective for use in a grouting composition.

Any liquid that comprises water can be used in the composition of the first embodiment of the invention. The liquid can also comprise a second liquid such as a freezing point depressing material. The second liquid can be a polyalcohol such as ethylene glycol and propylene glycol, solution of calcium chloride, solution of sodium chloride, and combinations of two or more thereof.

A suitable liquid can also comprise a thickener, which keeps the liquid in diffused or well-mingled form. Examples of suitable thickeners include, but are not limited to, cellulose, methylcellulose, hydroxyethyl cellulose, and combinations of two or more thereof. A thickener can be present in the first component in any quantity that can thicken the liquid, generally in the range of from about 0.1 to about 30 weight %, based on the total weight of the liquid.

According to the invention, the invention can also comprise a sugar. The term "sugar" refers to a carbohydrate selected from the group consisting of monosaccharides, disaccharides, trisaccharides, tetrasaccharides, oligosaccharides, sugar alcohols, derivatives thereof, and combinations of two or more thereof. Generally a suitable oligosaccharide has about 4 to about 25, preferably 4 to 20, repeat units per molecule, The preferred sugar includes sorbitol, corn syrup, or combinations thereof.

A solid particulate is often served as filler in the composition of the invention to provide the interfacial strength and the desired rheological properties of the composition. The term "solid particulate" is interchangeable with the term "filler". Any solid particulate material that is substantially inert toward water and toward the materials in the composition into which it is to be incorporated can be used. Examples of suitable solid particulates include, but are not limited to, limestone (calcium carbonate), sand, cement, gypsum, gypsum plaster, fiber glass, paper fiber, and combinations of two or more thereof. Limestone and sand are preferred fillers, limestone being especially preferred because of pumping and cost considerations. Other solid particulate materials can be used, such as those described in U.S. Pat. No. 4,280,943, disclosure of which is herein incorporated by reference. Different particle sizes and shapes can be used, as can combinations of different fillers.

Peroxide can be present in the first component in any quantity as long as an effective grouting composition can be produced. Presently it is preferred that the peroxide be present in the first component in the range of from about 0.5 to about 10 weight percent (%), preferably about 1 to about 4%, and most preferably 1.5 to 2%.

The weight percent of the liquid in the first component of the invention composition can be any % as long as the percentage can provide a stabilized grouting composition. Generally, the weight % of liquid can be in the range of from about 5 to about 35%, preferably about 10 to about 30%, and most preferably 15 to 25%, based on the total weight of the first component.

The water content in the liquid can be in the range of from about 10 to about 100, preferably about 30 to about 75, and most preferably 40 to 70 weight %, based on the total weight of the liquid component. The second liquid, if present, makes up the rest of the liquid.

According to the present invention, the sugar, if used in the grouting composition, can be present in the first component in any quantity so long as the quantity can provide a stabilized grouting composition. Generally the weight % of sugar in the first component can be in the range of from about 1 to about 30%, preferably about 2 to about 20%, and most preferably 5 to 10%.

Similarly, the solid particulate can be present in the first component in such an amount that can produce a stabilized grouting composition. The weight % of the solid particulate can be in the range of from about 50 to about 90%, preferably about 70 to about 85%, and most preferably 75 to 80%.

According to the invention, the second component comprises a polymerizable polymer. The polymerizable polymer, for example, can be the polymerized product of a polyalcohol and an ethylenically unsaturated polycarboxylic acid or acid anhydride. Examples of such acids or acid anhydrides include, but are not limited to, maleic acid, fumaric acid, maleic anhydride, phthalic anhydride, and combinations of two or more thereof. An aliphatic polyalcohol can be ethylene glycol, propylene glycol, diethylene glycol, dipropylene glycol, 2-methyl-2,3-propanediol, or any dihydroxy compound that can be esterified with a carboxylic acid. Ethylene glycol or propylene glycol is the preferred polyalcohol. Examples of presently preferred polymers include, but are not limited to, polymers having repeat units derived from (1) ethylene glycol, propylene glycol, diethylene glycol, or combinations of two or more thereof, (2) maleic anhydride, phthalic acid, or combinations thereof, and (3) combinations of (1) and (2) because of cost and stability over a wide temperature range for up to one year, low toxic properties, and relatively high flash point.

The polymer can be present in the second component in a quantity such that a grouting composition can be produced. Generally, the weight % of the polymer in the second component can be in the range of from about 5 to about 40%, preferably about 7 to about 30%, and most preferably 10 to 20%.

According to the invention, any crosslinking agent which can crosslink with a polymer disclosed above can be used. Examples of suitable crosslinking agents include, but are not limited to, styrene, vinyl toluene, ethylene, propylene, butene, pentene, hexene, acrylate, methacrylate, N,N-dimethylacrylate, and combinations of two or more thereof. The presently preferred crosslinking agent is styrene because it is effective and readily available.

The quantity of the crosslinking agent required is the quantity that can produce a grouting composition having a reasonable gelling time and gel strength. Therefore, the crosslinking agent can be present in the second component in any quantity that can produce such grouting composition. The weight % of the crosslinking agent in the second component can be in the range of from about 1 to about 10%, preferably about 3 to about 7%.

The solid particulate, as disclosed above in the first embodiment of the invention, can be present in the second component in such an amount that can produce a stabilized grouting composition. The weight % of the solid particulate can be in the range of from about 50 to about 90%, preferably about 70 to about 85%, and most preferably 75 to 80%.

The second component can also comprise a promoter, which can produce a sufficiently strong and stable grouting composition. The presently preferred promoter is an amine such as, for example, aniline, dimethyl aniline, diethyl aniline, dipropyl aniline, dimethyl p-toluidine, or combinations of two or more thereof or a phenolic compound such as, for example, hydroquinone, hydroxy benzoic acids, or combinations of two or more thereof.

The promoter can be present in the second component in an amount that can produce a sufficiently strong and stable grouting composition. Generally, the amount can be in the range of from about 0.01 to about 5, preferably about 0.1 to about 3, more preferably about 0.15 to about 5, and most preferably 0.3 to 1 weight %, based on the total weight of the second component.

The second component can further comprise a sugar, a liquid, a stabilizer, or combinations of two or more thereof. The definitions and examples of sugar, and liquid are the same as those disclosed above. The quantities of sugar, promoter, and liquid in the second component can also be the same as those disclosed above for the first component. A stabilizer such as a phenolic compound can be used in the composition in the range of from about 0.0001 to about 5 weight %. Specific examples of stabilizers include, but are not limited to, hydroquinone, p-hydroxybenzoic acid, aminophenol, and combinations of two or more thereof.

The first and second components can be produced by combining individual components using any suitable means known to one skilled in the art such as, for example, blending, mixing, or kneading. A grouting composition can be produced by combining the first and second components by the means disclosed in U.S. Pat. Nos. 3,861,522 and 4,280,943, disclosures of which are herein incorporated by reference.

Generally, the weight ratio of the first component to the second component can be in the range of from about 0.1:1 to about 10:1, preferably 1:1 to 1:5.

The composition of the present invention can be used for anchoring a strengthening or reinforcing member in a hole.

The present invention further provides a process that can be used to substantially improve the firmness of a grouting composition. The process comprises introducing a compressible substance into a grouting composition. The definition, scope, quantity, and method of introduction of the compressible substance are the same as those disclosed above and description of which is omitted herein for the interest of brevity. The compressible substance can be introduced into the first component, the second component, or both disclosed above.

Any grouting compositions known to one skilled in the art can be used. For example, the compositions disclosed in the U.S. Pat. Nos. 3,861,522 and 4,280,943 can be used. The combinations of the first component and second component disclosed above can also be used as a grouting composition.

The following examples are provided to further illustrate the invention and are not to be construed as to unduly limit the scope of the invention.

Example 1

The composition of a control cartridge was approximately 38% catalyst premix (first component) and 62% resin premixes (second component). The first component contained approximately 2% active benzoyl peroxide, 80% limestone, 10% water, and 8% sorbitol and less than 0.1% thickener (hydroxyethyl cellulose). The second component contained approximately 14% polyester unsaturated resin (propylene glycol-maleate-phthalate polyester) purchased from Reichhold Chemicals, Inc. (Bridgeville, Pa.) and 86% limestone filler.

Three cartridges having the same composition disclosed in above paragraph were made by standard manufacturing procedure, which is well known to one skilled in the art. Cartridge A was control, i.e., no added compressible substance. Cartridges B and C, were duplicates, which contained the invention compositions that were made by injecting 10 cc of air, using a gas tight syringe. All three cartridges were monitored for weight loss over a period of time.

Each cartridge was also determined for its limpness over the period of time using the "limp test". The "limp test" was carried out by placing each cartridge on a tabletop, 105 mm (millimeters) off the base. At different time intervals (days at room temperature, about 25° C.) the drop from horizontal was monitored along with the corresponding weight loss. The "limp test" is depicted below. When the end of cartridge touched the tabletop (dropped 105 mm) the product is said to have failed (using this test procedure).

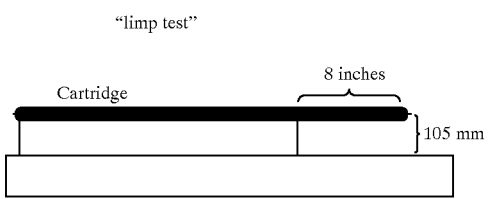

The results are shown in the Table 1 below. In Table 1, the numbers in the first column indicates age of the cartridge, days at room temperature. Under each cartridge the first column indicates the weight loss in grams and the second column represents the drop from horizontal (failed indicates a drop of 105 mm or greater).

TABLE 1

| Days at room temp | CARTRIDGE A Control | | CARTRIDGE B 10 cc air added | | CARTRIDGE C 10 cc air added | |
|---|---|---|---|---|---|---|
| | wt loss (g) | mm drop | wt loss (g) | mm drop | wt loss (g) | mm drop |
| 8 | 1.8 | 0 | 0.2 | 0 | 0.5 | 0 |
| 20 | 4.9 | 10 | 5.9 | 0 | 6.4 | 0 |
| 27 | 6.5 | 55 | 7.4 | 3 | 8 | 3 |
| 29 | 6.8 | 90 | 7.8 | 6 | 8.3 | 5 |
| 34 | 7.6 | failed | 8.5 | 10 | 9.1 | 10 |
| 59 | 13.3 | failed | 14.3 | 64 | 14.9 | 67 |

The above table shows that the injection or presence of air significantly improved the shelf life of the product as measured by product firmness. The cartridges injected with 10 cc of air showed an improvement that was greater than 2 times that of control cartridge (from 29 days to 59 days.

Example 2

The above-described tests were repeated with the exception that cartridges were injected continuously with nitrogen, instead of air, at a packaging machine. A 0.0625-inch (1.59 mm) outside diameter tube was extended concentrically into the resin premix fill tube. Nitrogen was metered into this small tube from a compressed nitrogen cylinder. It produced a fine stream of bubbles in the resin premix. The amount of resin premix and nitrogen was varied to produce cartridges with varying amounts of nitrogen. The difference in weight, density and volume between the cartridges was used to calculate the volume of nitrogen in each cartridge. The results are shown in Table 2 below.

TABLE 2*

| Days at RT | cartridge 1 (1.2 cc) | | cartridge 2 (5.4 cc) | | cartridge 3 (12.8 cc) | | cartridge 4 (25.5 cc) | | cartridge 5 (29.1 cc) | | cartridge 6 (30.2 cc) | | cartridge 7 (31.9 cc) | |
|---|---|---|---|---|---|---|---|---|---|---|---|---|---|---|
| | wt loss | mm drop | wt loss | mm drop | wt loss | mm drop | wt loss | mm drop | wt loss | mm drop | wt loss | mm drop | wt loss | mm drop |
| 0 | 0 | 0 | 0 | 0 | 0 | 0 | 0 | 0 | 0 | 0 | 0 | 0 | 0 | 0 |
| 5 | 1.5 | 1 | 1.3 | 0 | 1.4 | 1 | 1.4 | 1 | 1.6 | 0 | 1.7 | 0 | 1.7 | 0 |
| 12 | 3.1 | 13 | 2.8 | 2 | 3.1 | 3 | 3.1 | 1 | 3.6 | 0 | 3.8 | 0 | 3.5 | 0 |
| 16 | 4.1 | 13 | 3.8 | 4 | 3.9 | 4 | 4.1 | 2 | 4.6 | 0 | 5.1 | 1 | 4.7 | 1 |
| 20 | 4.9 | 94 | 4.6 | 15 | 4.8 | 11 | 4.9 | 2 | 5.7 | 0 | 5.9 | 1 | 5.7 | 1 |
| 23 | 5.6 | 93 | 5.4 | 24 | 5.5 | 31 | 5.8 | 1 | 6.5 | 0 | 7.8 | 4 | 6.5 | 0 |
| 27 | 6.4 | 105 | 6.3 | 90 | 6.6 | 28 | 6.7 | 0 | 7.6 | 0 | 8.8 | 0 | 7.6 | 5 |
| 33 | 7.9 | F | 7.7 | 94 | 7.9 | 47 | 8.2 | 12 | 9.3 | 0 | 9.6 | 0 | 9.2 | 9 |
| 41 | ND | F | 9.5 | F | 9.8 | 74 | 10.1 | 15 | 11.3 | −5 | 11.7 | 14 | 11.3 | 15 |
| 71 | ND | F | F | F | F | F | 17.1 | F | 19.1 | 21 | 19.2 | 17 | 18.8 | 12 |

*RT, room temperature; cartridge 1 was a control that did not contain added compressible gas; wt, weight; mm drop, the distance dropped in milliliter; F, failed — the cartridge had dropped >105 mm from horizontal (see drawing for explanation); ND, not determined — product had failed test; wt loss, weight loss.

Table 2 shows that after 27 days the control cartridge 1 had dropped 105 mm (failed) whereas those cartridges containing 25.5 to 31.1 cc of nitrogen were substantially firm and no signs of limpness were observed, within the same 27 days. Table 2 therefore clearly shows the advantage of containing nitrogen in the cartridge to retain stiffness. This table also shows that as the amount of nitrogen was increased the cartridges stayed stiffer longer.

What is claimed is:

1. A grouting composition comprising a first component, a second component, and a compressible substance wherein said first component comprises a peroxide, a liquid which comprises water, and a solid particulate; said second component comprises a polymer, a crosslinking agent, and a solid particulate and said liquid is present in said first component in the range of from about 5 to about 35 weight % of said polymer and said first component, second component, or both further comprises sugar.

2. A composition according to claim 1 wherein said compressible substance is present in the first component, second component, or both.

3. A composition according to claim 1 wherein said compressible substance is selected from the group consisting of nitrogen, oxygen, air, foam rubber, carbon dioxide, argon, and combinations of two or more thereof.

4. A composition according to claim 3 wherein said compressible substance is selected from the group consisting of air, nitrogen, and combinations thereof.

5. A composition according to claim 3 wherein said compressible substance is air or nitrogen.

6. A composition according to claim 1 wherein said peroxide is selected from the group consisting of benzoyl peroxide, dichlorobenzoyl peroxide, dibromobenzoyl peroxide, dimethoxy benzoyl peroxide, and combinations of two or more thereof.

7. A composition according to claim 1 wherein said peroxide is benzoyl peroxide.

8. A composition according to claim 7 wherein said liquid further comprises a freezing point-depressing material.

9. A composition according to claim 8 wherein said freezing point-depressing material is ethylene glycol.

10. A composition according to claim 1 wherein said sugar is sorbitol or corn syrup.

11. A composition according to claim 9 wherein said first component, second component, or both further comprises a sorbitol or corn syrup.

12. A composition according to claim 1 wherein said solid particulate is selected from the group consisting of calcium carbonate, limestone, sand, cement, gypsum, fiber glass, paper fibers, and combinations of two or more thereof.

13. A composition according to claim 10 or 11 wherein said solid particulate is selected from the group consisting of calcium carbonate, limestone, sand, cement, gypsum, fiber glass, paper fibers, and combinations of two or more thereof.

14. A grouting composition comprising a first component, a second component, and a compressible substance wherein said first component comprises a peroxide, a liquid which comprises water, and a solid particulate;

said second component comprises a polymer, a crosslinking agent, said liquid, and said solid particulate;

said compressible substance is selected from the group consisting of nitrogen, oxygen, air, carbon dioxide, foam rubber, carbon dioxide, argon, and combinations of two or more thereof;

said peroxide is selected from the group consisting of benzoyl peroxide, dichlorobenzoyl peroxide, dibromobenzoyl peroxide, dimethoxy benzoyl peroxide, and combinations of two or more thereof;

said solid particulate is selected from the group consisting of calcium carbonate, limestone, sand, cement, gypsum, fiber glass, paper fibers, and combinations of two or more thereof; and said liquid is present in said first compartment in the range of from about 5 to about 35 weight % of said polymer and said first component, second component, or both further comprises sugar.

15. A composition according to claim 14 wherein said sugar is selected from the group consisting of monosaccharides, disaccharides, trisaccharides, tetrasaccharides, oligosaccharides, sugar alcohols, and combinations of two or more thereof.

16. A composition according to claim 14 wherein said peroxide is benzoyl peroxide, said liquid further comprises ethylene glycol, said solid particulate is calcium carbonate, said crosslinking agent is styrene, and said compressible substance is selected from the group consisting of air, nitrogen, and combinations thereof.

17. A process comprising combining a grouting composition with a compressible substance wherein said composition comprises a first component and a second component; said first component comprises a peroxide, a liquid which comprises water, and a solid particulate; and said second component comprises a polymer and a crosslinking agent.

18. A process according to claim 17 wherein said compressible substance is selected from the group consisting of nitrogen, oxygen, air, carbon dioxide, foam rubber, and combinations of two or more thereof;

said peroxide is selected from the group consisting of benzoyl peroxide, dichlorobenzoyl peroxide, dibromobenzoyl peroxide, dimethoxy benzoyl peroxide, and combinations of two or more thereof; and said solid particulate is selected from the group consisting of calcium carbonate, limestone, sand, cement, gypsum, fiber glass, paper fibers, and combinations of two or more thereof.

19. A process according to claim 18 wherein said peroxide is benzoyl peroxide, said liquid further comprises ethylene glycol, said solid particulate is calcium carbonate, and said crosslinking agent is styrene.

20. A composition according to claim 2 wherein said compressible substance is selected from the group consisting of nitrogen, oxygen, air, foam rubber, carbon dioxide, argon, and combinations of two or more thereof.

21. A composition according to claim 20 wherein said compressible substance is selected from the group consisting of air, nitrogen, and combinations thereof.

22. A composition according to claim 2 wherein said peroxide is benzoyl peroxide.

23. A composition according to claim 4 wherein said peroxide is benzoyl peroxide.

24. A composition according to claim 5 wherein said peroxide is benzoyl peroxide.

25. A composition according to claim 6 wherein said peroxide is benzoyl peroxide.

26. A composition according to claim 22, 23, 24, or 25 wherein said liquid further comprises a freezing point-depressing material.

* * * * *